(12) United States Patent
Lin et al.

(10) Patent No.: US 7,085,130 B2
(45) Date of Patent: Aug. 1, 2006

(54) ELECTRONIC DEVICE AND BUTTON STRUCTURE

(75) Inventors: San-Feng Lin, Sinjhuang (TW); Yi-Chuan Li, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 0 days.

(21) Appl. No.: 10/952,866

(22) Filed: Sep. 30, 2004

(65) Prior Publication Data

US 2005/0180099 A1 Aug. 18, 2005

(30) Foreign Application Priority Data

Feb. 12, 2004 (TW) .............................. 93103408 A

(51) Int. Cl.
*G06F 1/16* (2006.01)
(52) U.S. Cl. ...................... 361/683; 345/344; 340/512; 710/62
(58) Field of Classification Search ............... 340/5.53, 340/512; 200/5 A, 344; 345/156, 629; 361/679–687, 361/724–727; 710/62
See application file for complete search history.

(56) References Cited

U.S. PATENT DOCUMENTS

| 5,231,380 | A  | * | 7/1993 | Logan  | 345/156 |
| 6,355,890 | B1 | * | 3/2002 | Kuroda | 200/5 A |
| 2003/0051982 | A1 | * | 3/2003 | Lewis | 200/5 A |
| 2004/0155752 | A1 | * | 8/2004 | Radke | 340/5.53 |

* cited by examiner

*Primary Examiner*—Hung Van Duong
(74) *Attorney, Agent, or Firm*—Birch, Stewart, Kolasch & Birch, LLP

(57) ABSTRACT

A button structure is disposed on a housing and the housing has at least one opening. The button structure includes at least one button portion and a supporting frame. The button portion has a first portion and a second portion. The first portion is fixed on the housing. The second portion covers the opening. The supporting frame is set in the opening. The supporting frame is connected with the housing and faces the second portion. An electronic apparatus, which includes a housing and a button structure, is also provided.

20 Claims, 5 Drawing Sheets

ELECTRONIC DEVICE AND BUTTON STRUCTURE

This Nonprovisional application claims priority under 35 U.S.C. § 119(a) on Patent Application No(s). 093103408 filed in Taiwan, Republic of China on Feb. 12, 2004, the entire contents of which are hereby incorporated by reference.

1. Field of Invention

The invention relates to an electronic device and a button structure and, in particular, to a button structure that has a supporting frame for the buttons to have indirect contact with electrical switches.

2. Related Art

Due to many advances in modern technologies, many devices that generate control signals to move cursors on the displays of portable electronic products have been invented. Such devices include the mouse, track ball, joystick, touch pad, and track point. The invention of the touch pad, in particular, enables the user to control the cursor position on the computer monitor by moving one finger on the surface of the touch pad along with the manipulation of several touch pad buttons. It further contains the functions of the left and right buttons of the mouse. Therefore, it is a very useful and convenient tool.

As shown in FIG. 1, a conventional touch pad button structure 1 is installed one a fixed board 12 under the touch pad 11. The fixed board 12 is then fixed on the top cover 13 of a laptop computer. The button structure 1 has at least one plastic button body 14, which is installed in the button opening 15 of the laptop computer top cover 13 through a connecting rod 141. The bottom of the button body 14 is installed with corresponding electrical switches 16. The plastic button body 14 elastically press against the top of the electrical switches 16 through the connecting rod 141, resulting in electrical couplings. The elastic force of the electrical switches 16 returns the button body 14 to its original position.

When the user presses the button body 14 to activate the electrical switches 16, the elasticity of the connecting rod 141 bring the button body 14 back to its original position. However, the connecting rod will gradually have elastic fatigue over a long-term use. The connecting rod 141 may even break, so that the electrical switches cannot be triggered. In this case, the whole touch pad button structure has to be replaced. In view of the foregoing, the invention provides an electric device and a button structure that can solve the problems.

SUMMARY OF THE INVENTION

In view of the above, the invention is to provide an electronic device and a button structure. In particular, the invention is a button structure that contains a supporting frame for the buttons to have indirect contact with the electrical switches.

To achieve the above, the button structure of the invention is disposed on a housing, which has at least one opening. The button structure has at least one button portion and a supporting frame. The button portion has a first portion and a second portion. The first portion is fixed on the housing. The second portion covers the opening. The supporting frame is set in the opening, connected to the housing, and facing the second portion.

The electronic device of the invention includes a housing and a button structure. The housing has at least one opening. The button structure contains at least one button portion and a supporting frame. The button portion contains a first portion and a second portion. The first portion is fixed on the housing. The second portion covers the opening. The supporting frame is set in the opening, connected to the housing, and facing the second portion.

As described before, the electronic device and button structure of the invention use a flexible supporting frame connecting to the housing. When imposing a pressure on the button portion, the supporting frame descends to trigger the switch unit. In comparison with the prior art, the disclosed button structure has indirect contact with the switch unit through the supporting frame. Therefore, the force received by the button portion is partially absorbed by the flexible supporting frame. Only part of the force is transmitted to the switch unit, thereby elongating its lifetime.

BRIEF DESCRIPTION OF THE DRAWINGS

The invention will become more fully understood from the detailed description given hereinbelow illustration only, and thus is not limitative of the present invention, and wherein.

DETAILED DESCRIPTION OF THE INVENTION

Figure 1:
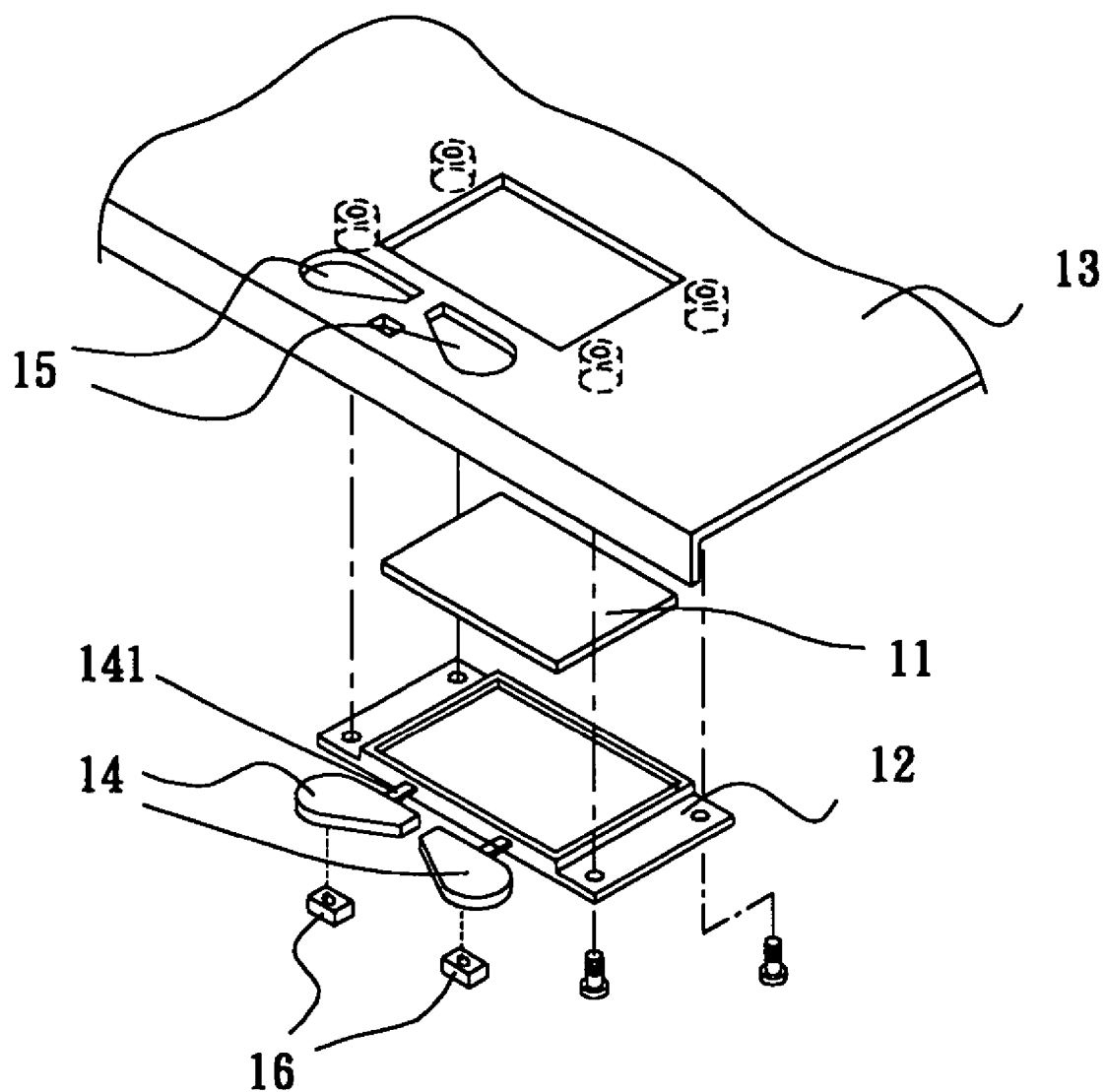
FIG. 1 is a schematic view of a conventional touch pad button structure.
Figure 2:
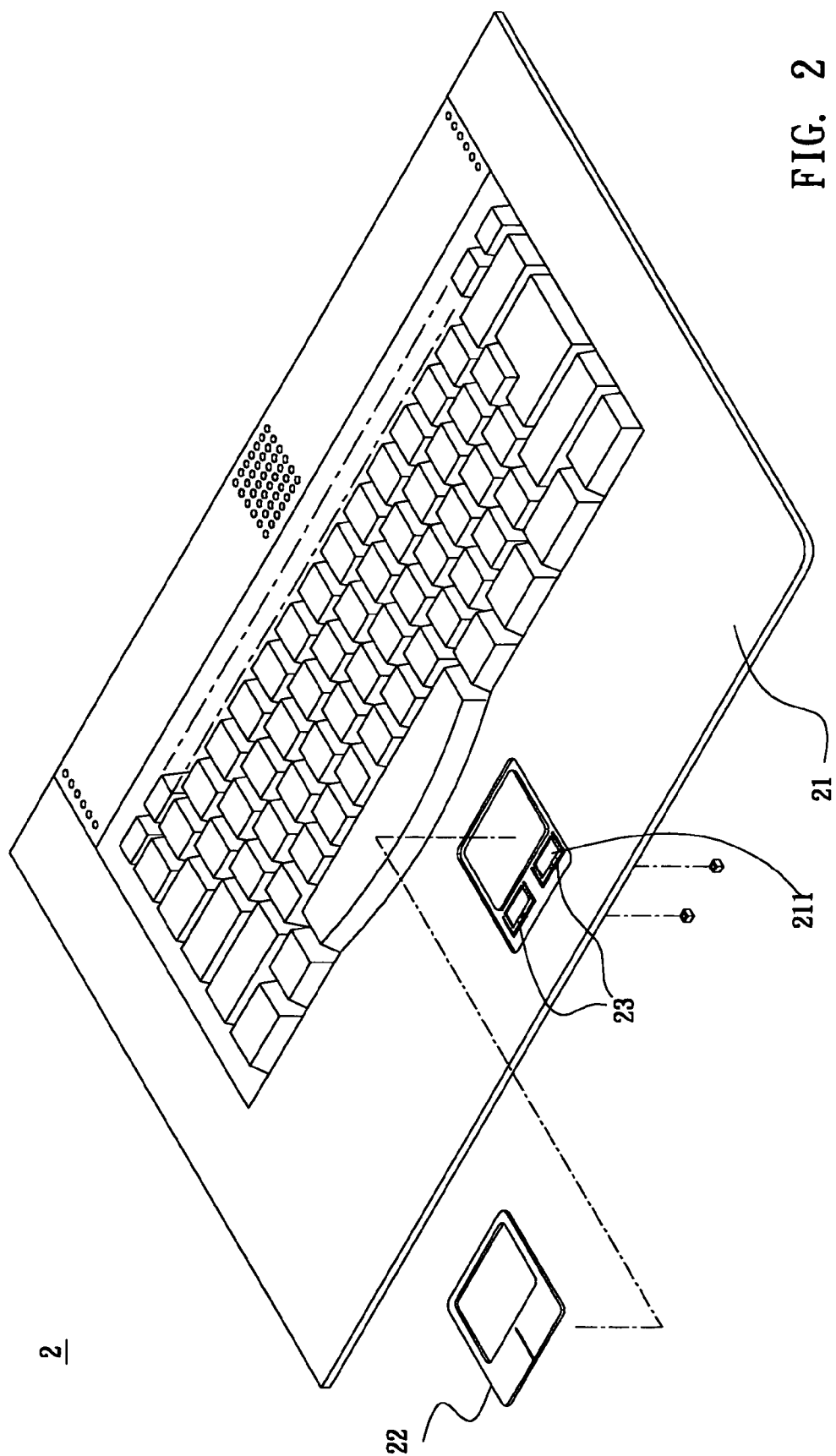
FIG. 2 is a schematic view of the disclosed button structure.

With reference to FIG. 2, the disclosed button structure 2 is disposed on a housing 21 with at least one opening 211. The button structure 2 has at least one button portion 22 and a supporting frame 23. The housing 21 is a shell of an electronic device, such as a laptop computer or a personal digital assistant (PDA).

Figure 3:
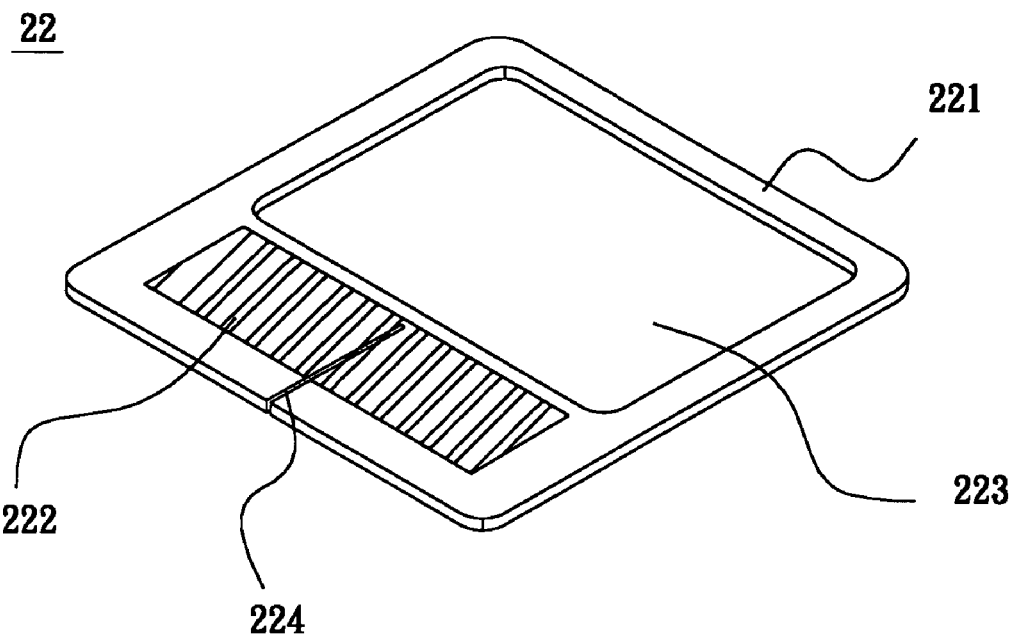
FIG. 3 is a schematic view of the disclosed button portion.

With reference to FIG. 3, the button part 22 contains a first portion 221 and a second portion 222 (slant lines). The first portion 221 is fixed on the housing 21. The second portion 222 covers the opening 211. The material of the button portion 22 is either a metal or a plastic. In this embodiment, the button portion 22 further has a touch pad opening 223 for accommodating the touch pad. Moreover, the button portion 22 has a slit 224 to separate the button portion 22 into the left and right buttons.

Figure 4:
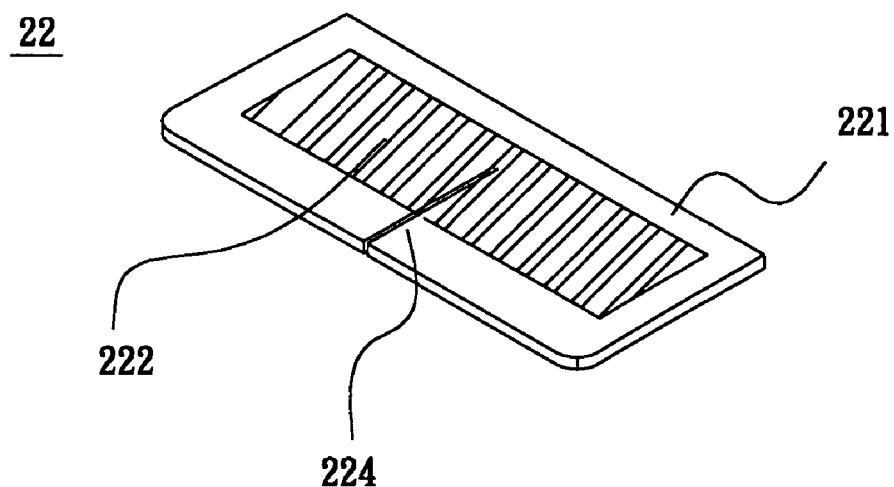
FIG. 4 is another schematic view of the disclosed button portion.

The button portion 22 may contain a first portion 221 and a second portion 222 (slant lines) as shown in FIG. 4. In this embodiment, the button portion 22 is smaller and does not have the touch pad opening 223 as in FIG. 3.

Figure 5:
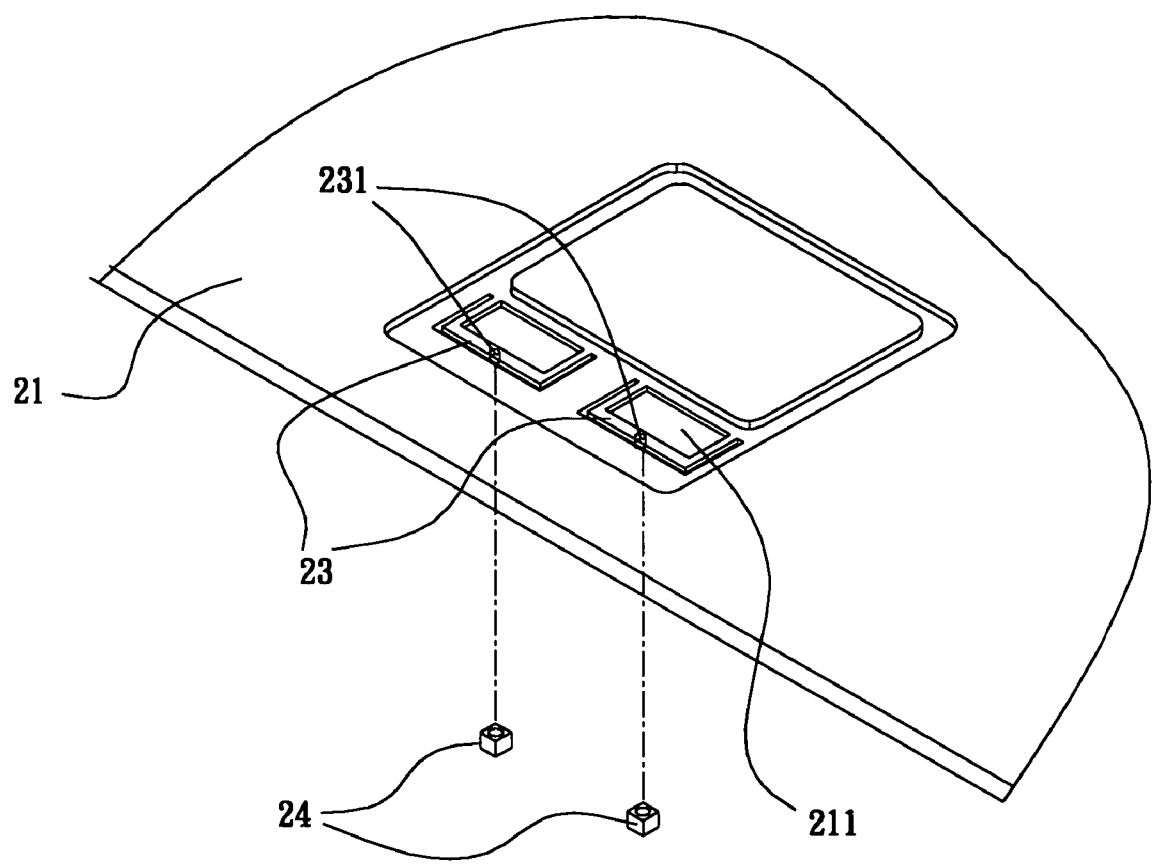
FIG. 5 is a schematic view of the disclosed supporting frame.
Figure 6:
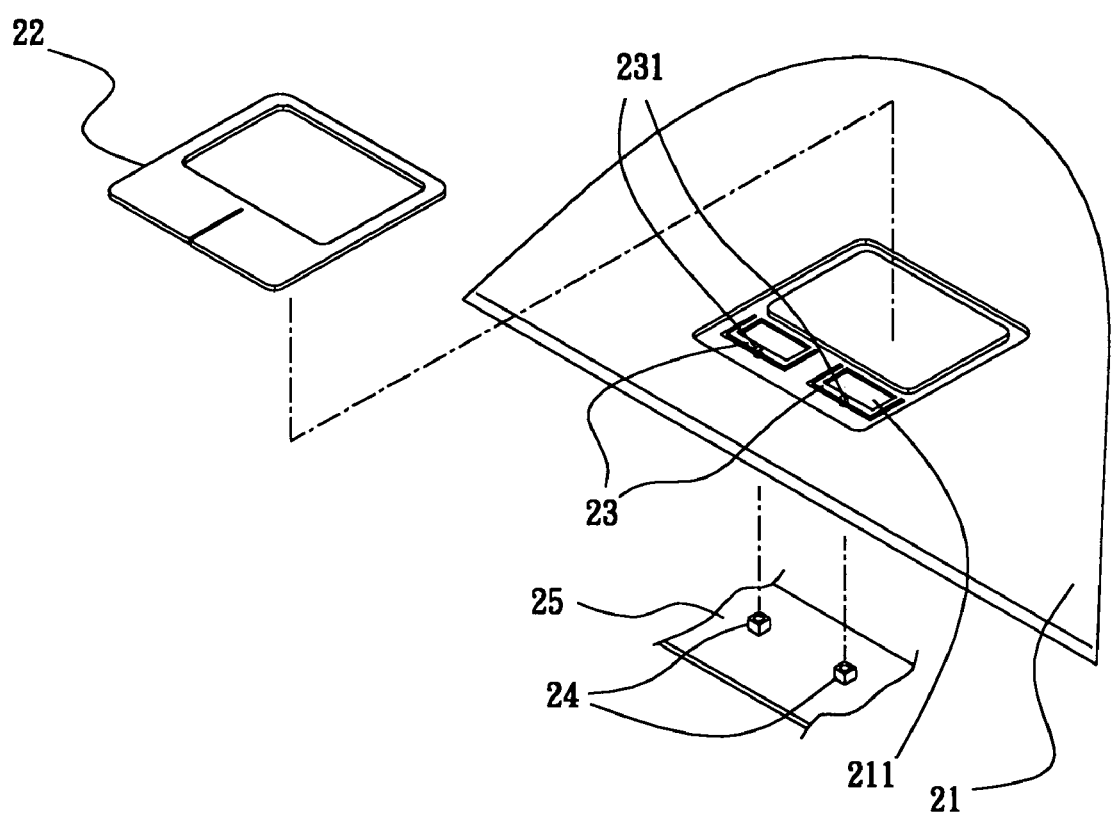
FIG. 6 is a schematic view of the disclosed electronic device.

As shown in FIG. 5, the supporting frame is set in the opening 211 and connected to the housing 21, facing the second portion 222 (FIG. 6). The connection between the supporting frame 23 and the housing 21 can be formed by ejection molding or using a thermal adhesive to combine the supporting frame 23 and the housing 21. The supporting frame 23 is flexible and in a U or H shape (FIG. 5).

As shown in FIG. 6, the button structure 2 further contains at least one switch unit 24 installed inside the housing 21. The supporting frame 23 triggers the switch unit 24 when a pressure is imposed thereon. Moreover, the supporting frame 23 opposite to the switch unit-24 side has a protruding part 231, facing the switch unit 24. Therefore, when the pressure is imposed on the supporting frame 23, the protruding part on the supporting frame 23 can trigger the switch unit 24. The switch unit 24 is installed on a circuit board 25.

When operating the buttons on the touch pad, the pressure imposed on the button portion 22 is mostly absorbed by the flexible supporting frame 23. The supporting frame 23 may have a U or H shape. Thus, they have two arms to support the pressure on the button portion 22. Even if one arm is broken, the supporting frame 23 can keep imposing the pressure on the switch unit 24 without affecting the operation of the buttons.

FIG. 6 shows a preferred embodiment of the disclosed electronic device. As shown in the drawing, the electronic device 2' includes a housing 21, a button portion, and a supporting frame 23. Here the electronic device 2' is a laptop computer or a PDA. The housing 21 has at least one opening 211 and forms the shell of the electronic device (such as the shell of a laptop computer or PDA).

With reference to FIG. 3, the button portion 22 contains a first portion 221 and a second portion 222 (slant lines). The first portion 221 is fixed on the housing 21, and the second portion 22 covers the opening 211. The button portion 22 is made of a metal or plastic. In this embodiment, the button portion 22 further has a touch pad opening 223 for accommodating the touch pad. The button portion 22 further has a slit 224 to separate the left and right buttons in the button portion 22.

As shown in FIG. 5, the supporting frame 23 is set in the opening 211 and connected to the housing 21, facing the second portion 222. The connection between the supporting frame 23 and the housing 21 can be formed by-injection molding. Of course, the connection can be made using a thermal adhesive. The supporting frame 23 is flexible and has a U or H shape (as shown in FIG. 5).

As shown in FIG. 6, the disclosed electronic device 2' contains at least a switch unit 24 installed inside the housing 21. The supporting frame 23 triggers the switch unit 24 when a pressure is imposed thereon. Moreover, the supporting frame 23 opposite to the switch unit 24 side has a protruding part 231, facing the switch unit 24. Therefore, when the pressure is imposed on the supporting frame 23, the protruding part on the supporting frame 23 can trigger the switch unit 24.

When operating the buttons on the touch pad, the pressure imposed on the button portion 22 is mostly absorbed by the flexible supporting frame 23. The supporting frame 23 may have a U or H shape. Thus, they have two arms to support the pressure on the button portion 22. Even if one arm is broken, the supporting frame 23 can keep imposing the pressure on the switch unit 24 without affecting the operation of the buttons.

In summary, the electronic device and button structure provided by the invention utilizes a flexible supporting frame connected to the housing. When a pressure is imposed on the button portion, the supporting frame also descends to trigger the switch unit. In comparison with the prior art, the disclosed electronic device and button structure uses the supporting frame to have indirect contact with the switch unit. When operating the buttons, the force received by the button portion is alleviated by the flexible supporting frame. The rest force is transmitted to the switch unit. Therefore, the lifetime of the button can be elongated. The disclosed button portion replaces the buttons in the prior art. The production procedure is simpler, the button structure is thinner, and the design is more beautiful.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A button structure installed in a housing with at least one opening, the button structure comprising:
   at least one button portion, which contains a first portion and a second portion, the first portion being fixed on the housing and the second portion covering the opening; and
   a supporting frame, which is set in the opening, connected to the housing and being below the second portion.

2. The button structure of claim 1, further comprising at least one switch unit installed inside the housing, wherein the supporting frame triggers the switch unit when a pressure is imposed thereon.

3. The button structure of claim 1, wherein a protruding part is formed on the side of the supporting frame opposite to the switch unit, and the protruding part faces the switch unit.

4. The button structure of claim 1, wherein the material of the button portion is a metal.

5. The button structure of claim 1, wherein the material of the button portion is a plastic.

6. The button structure of claim 1, wherein the supporting frame and the housing are formed by injection molding.

7. The button structure of claim 1, wherein the supporting frame is flexible.

8. The button structure of claim 1, wherein the supporting frame has a U shape.

9. The button structure of claim 1, wherein the supporting frame has an H shape.

10. An electronic device, comprising:
    a housing, which has at least one opening; and
    a button structure, which includes at least one button portion and a supporting frame,
    wherein, the button portion includes a first portion and a second portion, the first portion is fixed on the housing, the second portion covers the opening, and the supporting frame is set in the opening, connected to the housing, and being below the second portion.

11. The electronic device of claim 10, wherein the electronic device is a notebook computer.

12. The electronic device of claim 10, wherein the electronic device is a personal digital assistant (PDA).

13. The electronic device of claim 10, further comprising at least one switch unit installed inside the housing, wherein the supporting frame triggers the switch unit when a pressure is imposed thereon.

14. The button structure of claim 10, wherein a protruding part is formed on the side of the supporting frame opposite to the switch unit, and the protruding part faces the switch unit.

15. The button structure of claim 10, wherein the material of the button portion is a metal.

16. The button structure of claim 10, wherein the material of the button portion is a plastic.

17. The button structure of claim 10, wherein the supporting frame and the housing are formed by injection molding.

18. The button structure of claim 10, wherein the supporting frame is flexible.

19. The button structure of claim 10, wherein the supporting frame has a U shape.

20. The button structure of claim 10, wherein the supporting frame has an H shape.

* * * * *